(No Model.)
O. B. JENNINGS.
EVAPORATOR FOR MAKING SUGAR FROM SACCHARINE JUICE, &c.
No. 287,545. Patented Oct. 30, 1883.
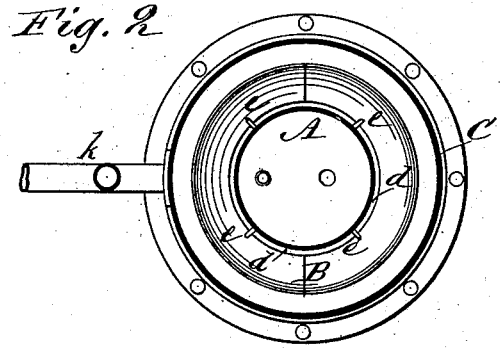
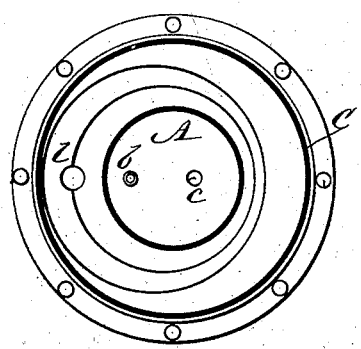
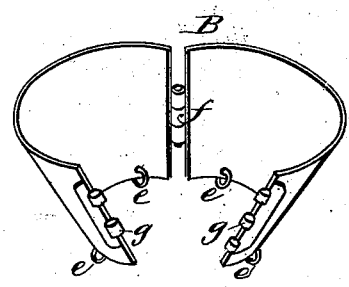
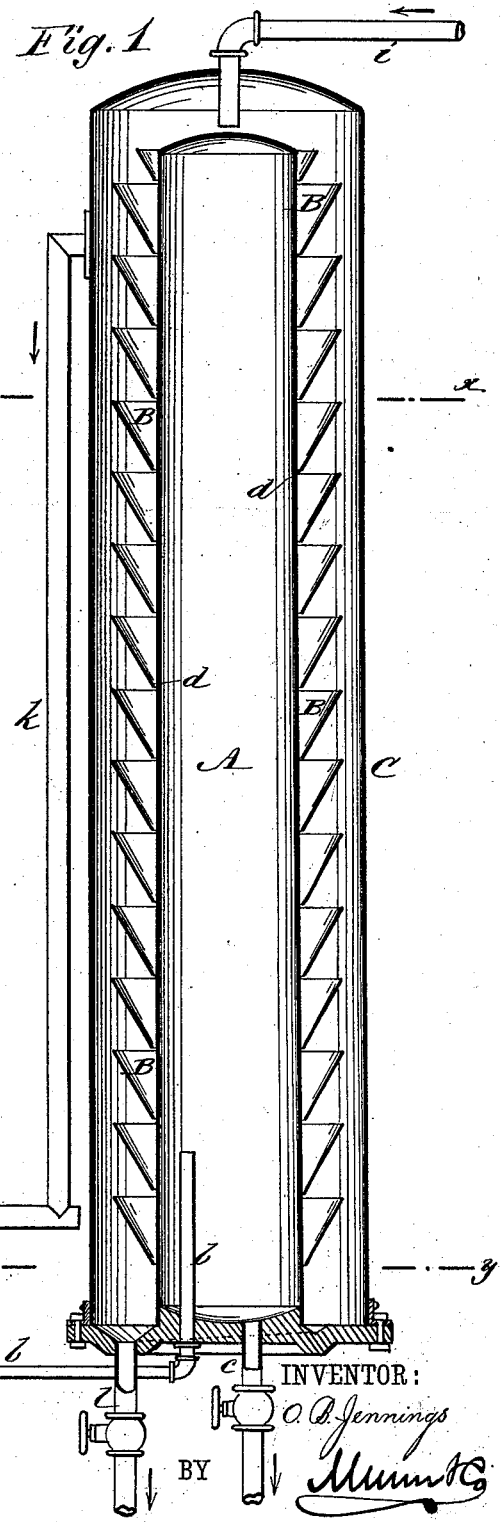
WITNESSES:
C. Neveux
C. Sedgwick
INVENTOR:
O. B. Jennings
BY Munn & Co
ATTORNEYS.

UNITED STATES PATENT OFFICE.

ORLANDO B. JENNINGS, OF HONEY CREEK, WISCONSIN.

EVAPORATOR FOR MAKING SUGAR FROM SACCHARINE JUICES, &c.

SPECIFICATION forming part of Letters Patent No. 287,545, dated October 30, 1883.

Application filed April 2, 1883. (No model.)

*To all whom it may concern:*

Be it known that I, ORLANDO BATES JENNINGS, of Honey Creek, in the county of Walworth and State of Wisconsin, have invented certain new and useful Improvements in Evaporators for Making Sugar from Saccharine Juices, and for other purposes, of which the following is a full, clear, and exact description.

This invention consists in an evaporator of novel construction, and which includes peculiar and novel combinations of parts, the same to be used as an open pan or as an evaporator for boiling *in vacuo* in making sugar from saccharine juices, or for the manufacture of salt, and for condensing alkaline solutions, condensing milk, and other like purposes. It will suffice, however, here, by way of explaining the invention, to describe it mainly as applied to the manufacture of sugar.

The invention comprises an upright externally-evaporating cylinder provided with a series of outer distributing-cups for the juice or liquid to be evaporated as it is run in a thin film down over the outside of said cylinder; also, a special construction of said cups to provide for their ready attachment and detachment, and other details in combination, substantially as hereinafter described.

Reference is to be had to the accompanying drawings, forming part of this specification, in which similar letters of reference indicate corresponding parts in all the figures.

Figure 1 represents a vertical section of an evaporator embodying my invention. Fig. 2 is a horizontal section on the line $x$ $x$ in Fig. 1, and Fig. 3 is a horizontal section on the line $y$ $y$ in Fig. 1. Fig. 4 is a view in perspective of any one of a series of distributing-cups used in the evaporator, said view showing the cup as being opened to facilitate the detachment and cleaning of it and the placing of it in position in or on the evaporator.

A in the drawings indicates a vertical sheet-metal pipe or cylinder, made close or steam-tight both at its top and bottom. Steam is admitted to the interior of this cylinder by a pipe, $b$, and the water of condensation drained therefrom by a pipe, $c$. Around upon the outside of this cylinder are a series of cups, B, arranged one above the other. Each of these cups, which may be of sheet-iron, is made in the shape of the frustum of a cone, with its smaller end downward, and is constructed to leave an annular or other opening, $d$, at its bottom of one-twelfth ($\frac{1}{12}$) of an inch (more or less) width between it and the cylinder A, and which may be maintained by rings $e$, inserted in the bottom of the cup, to keep it at a proper distance from the cylinder at different points in its circumference; or the cup may be otherwise secured and adjusted. The upper ends of the cups may be of varied increased diameter as compared with their lower ends, according to their height. These cups B may be made in sections, hinged together, as at $f$, and secured, when closed, by an opposite opening joint, $g$, fastened by a removable pin, to provide for the separate detachment and cleaning of any of the cups when required and the separate placing of them in position on or around the cylinder A. The arrangement of the several cups on the cylinder A is such that each cup reaches up to a level, or thereabout, with the lower edge of the cup next above it. Arranged around or outside of this cylinder of cups A B is a second cylinder or case, C, through the top of which a pipe, $i$, is run to pass the sugar-juice to be evaporated onto the top or crown of the cylinder A, and connected with this outside cylinder or case is also a pipe, $k$, for attachment to a vacuum-pump or connection with a blast-draft when the apparatus is designed to evaporate *in vacuo*. At the bottom of the evaporator is a further pipe, $l$, for drawing off the sirup or evaporated product. These several pipes may each be provided with suitable cocks or valves to regulate or control them.

The juice or other liquid introduced by the supply-pipe $i$ onto the top of the evaporating-cylinder A will be held by the attraction of adhesion on the outer surface of said cylinder or vessel, and the attraction of gravitation will, by the aid of the cups B, spread the boiling juice or other liquid as it runs down the exterior of the cylinder, and passes in a thin film from cup to cup through their contracted bottom openings, $d$, over the whole outer surface, or from end to end of the cylinder A. Steam being admitted to the interior of the evaporating-cylinder A, and water being evaporated from the outside thereof, there can be no radiation or escape of heat other than what is absolutely used in producing the required evaporation. No evaporation can take place, excepting from the exterior of the cylinder A, with its attached distributing-cups B; hence the larger the surface that is exposed for a given quantity of sirup or liquid under treatment and the quicker the evaporation and release of the liquid from the action of the heat the better the result. Prolonged boiling of sirup-juice results, invariably, in a dark, tarry, offensive mass, while rapidly boiling in a thin film—such as takes place on or around the evaporating-cylinder A—produces an entirely different and better result. When evaporating by means of a steam coil or coils in a vessel containing the liquid, a loss of heat takes place by radiation from the entire outer surface of said vessel, which adds to the expense of fuel and necessitates an increased size and cost of steam-boiler and evaporator. By using my improved evaporator the resisting pressure to the evaporation of the water in the gradually-thickening sirup, which implies an increased heat, is reduced to a minimum, and the production of the sirup is completed at a temperature but little higher than that of boiling water. The time that any given portion of the juice is under heat is only what is consumed in its running in a thin film down the evaporating-cylinder A, and which need not be much over a minute. The density of the sirup at the discharge-pipe $l$ is under complete control, too, of the operator by his giving a greater or smaller feed of juice at the supply-pipe $i$ or more or less steam by the pipe $b$, as the case may require. The sirup drawn off by the pipe $l$ should be passed into two or more air-tight tanks, that serve to receive alternate charges of sirup as it is delivered in a constant stream from the evaporator.

In some cases or for certain purposes the evaporating cylinder or vessel A, with its distributing-cups B and steam and drain pipes $b$ $c$, may be used, without the outer cylinder or case, C, and exhaust-pipe $k$, to vacuum-pump or blast-draft devices. It then becomes an open-pan evaporator.

Of course the distributing-cups B are not necessarily restricted to the precise shape herein shown and described.

Having thus described my invention, I claim as new and desire to secure by Letters Patent—

1. The upright externally-evaporating cylinder or vessel A, provided with a series of cups, B, arranged one above the other on the exterior of said vessel, and constructed or provided with contracted openings at their bottoms, for distributing the liquid to be evaporated in a thin film over the outer surface of said cylinder or vessel, substantially as specified.

2. The combination, with the upright externally-evaporating cylinder A, provided with externally-arranged distributing-cups B, having contracted openings $d$ at their bottoms, and disposed one above the other, of the outer case, C, and exhaust-pipe $k$, essentially as and for the purposes herein set forth.

3. The distributing-cups B, constructed in opening and closing sections, as described, in combination with the evaporating cylinder or vessel A, whereby provision is made for readily placing and removing said cups, substantially as specified.

4. The combination of the externally-evaporating cylinder or vessel A, having distributing-cups B on its exterior, the overhead supply-pipe $i$, the steam pipe or duct $b$, the outer cylinder or vessel, C, and the exhaust-pipe $k$, essentially as herein set forth.

O. B. JENNINGS.

Witnesses:
   A. GREGORY,
   C. SEDGWICK.